United States Patent
Gordon et al.

(10) Patent No.: US 11,645,372 B2
(45) Date of Patent: May 9, 2023

(54) MULTIFACTOR HANDWRITTEN SIGNATURE VERIFICATION

(71) Applicant: International Business Machines Corporation, Armonk, NY (US)

(72) Inventors: Michael S. Gordon, Yorktown Heights, NY (US); Evelyn Duesterwald, Millwood, NY (US); Valentina Salapura, Chappaqua, OH (US); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 16/749,596

(22) Filed: Jan. 22, 2020

(65) Prior Publication Data
US 2021/0224515 A1    Jul. 22, 2021

(51) Int. Cl.
| | |
|---|---|
| *G06V 40/30* | (2022.01) |
| *G06F 21/40* | (2013.01) |
| *G06F 21/32* | (2013.01) |
| *G06K 9/62* | (2022.01) |

(52) U.S. Cl.
CPC ............ *G06V 40/394* (2022.01); *G06F 21/32* (2013.01); *G06F 21/40* (2013.01); *G06K 9/6221* (2013.01)

(58) Field of Classification Search
USPC ......................................... 382/116, 119, 190
See application file for complete search history.

(56) References Cited

U.S. PATENT DOCUMENTS

| | | | | |
|---|---|---|---|---|
| 4,701,960 | A | | 10/1987 | Scott |
| 5,111,512 | A | | 5/1992 | Fan et al. |
| 5,818,955 | A | * | 10/1998 | Smithies .................. G07C 9/35 |
| | | | | 713/176 |
| 7,529,391 | B2 | | 5/2009 | Lin et al. |
| 7,715,600 | B2 | * | 5/2010 | Avni ....................... G06F 21/36 |
| | | | | 382/116 |
| 7,904,725 | B2 | | 3/2011 | Pavlicic |
| 7,917,765 | B2 | | 3/2011 | Cramb |
| 8,678,273 | B2 | * | 3/2014 | McNeal .................. G07F 7/122 |
| | | | | 382/116 |
| 8,769,002 | B2 | * | 7/2014 | Katsuki ................ A61B 5/0002 |
| | | | | 340/539.12 |
| 8,922,342 | B1 | * | 12/2014 | Ashenfelter ........... G07C 9/257 |
| | | | | 382/129 |
| 9,262,676 | B2 | * | 2/2016 | Wang ..................... H04L 9/3231 |
| 9,268,904 | B1 | * | 2/2016 | Harding ................ G06F 16/212 |

(Continued)

OTHER PUBLICATIONS

Zhi et al. "Toward Monitoring Parkinson's Through Analysis of Static Handwriting Samples: A Quantitative Analytical Framewok," IEEE Journal of Biomedical and Health Informatics, vol. 21, No. 2, Mar. 2017, pp. 488-495.

(Continued)

*Primary Examiner* — Kathleen Y Dulaney
(74) *Attorney, Agent, or Firm* — Kelsey M. Skodje (57) ABSTRACT

A system, method, and computer program product for verifying signatures. The system includes at least one processing component, at least one memory component, and a reference storage comprising a set of reference signatures. The system also includes a model generator configured to generate a signature model based on the set of reference signatures. Further, the system includes a verification component configured to receive a signature, and determine whether the signature is valid.

21 Claims, 5 Drawing Sheets

(56) References Cited

U.S. PATENT DOCUMENTS

| | | | |
|---|---|---|---|
| 9,565,023 B2 | 2/2017 | Takahashi et al. | |
| 9,576,182 B2 | 2/2017 | Huteaux | |
| 10,095,851 B2* | 10/2018 | Seo | G06F 3/04883 |
| 10,693,872 B1* | 6/2020 | Larson | G06F 21/31 |
| 2003/0138135 A1* | 7/2003 | Chung | G07C 13/00 |
| | | | 382/119 |
| 2003/0233557 A1 | 12/2003 | Zimmerman | |
| 2004/0213437 A1* | 10/2004 | Howard | G06F 16/93 |
| | | | 707/999.009 |
| 2008/0148054 A1 | 6/2008 | Cahill et al. | |
| 2009/0254448 A1* | 10/2009 | Giobbi | G06Q 30/02 |
| | | | 713/168 |
| 2011/0265190 A1 | 10/2011 | Hsieh et al. | |
| 2014/0281946 A1* | 9/2014 | Avni | H04L 63/12 |
| | | | 726/4 |
| 2015/0046990 A1* | 2/2015 | Oberheide | G06F 21/45 |
| | | | 726/5 |
| 2015/0086088 A1* | 3/2015 | King | G06V 40/30 |
| | | | 382/118 |
| 2017/0046560 A1* | 2/2017 | Tsur | G06Q 20/363 |
| 2017/0324567 A1 | 11/2017 | Matsuo | |
| 2018/0025248 A1* | 1/2018 | Shan | G06F 3/017 |
| | | | 382/189 |
| 2019/0213385 A1* | 7/2019 | Tsur | G06V 40/30 |
| 2020/0153624 A1* | 5/2020 | Wentz | H04L 9/0866 |
| 2021/0124905 A1* | 4/2021 | Chen | G06V 40/382 |

OTHER PUBLICATIONS

"Automated Signature Validation Using Deep learning," Infrrd blogs, Feb. 8, 2018, 4 pgs. https://infrrd.ai/blogs/automated-signature-validation-using-deep-learning.

Srinivasan et al., "Machine Learning for Signature Verification," ICGVIP 2006, 5th Indian Conference on Computer Vision, Graphics and Image Processing, Dec. 2006, 17 pgs, https://cedar.buffalo.edu/~srihari/papers/ICGVIP2006-sig.pdf.

"Neural Networks on Handwritten Signature Verification (Artificial Intelligence)," what-when-how In Depth Tutorials and Information, printed: Sep. 19, 2019, 6 pgs, http://what-when-how.com/artificial-intelligence/neural-networks-on-handwritten-signature-verification-artificial-intelligence/.

"Autograph Authentication," PSA Services, printed: Sep. 19, 2019, 4 pgs. https://www.psacard.com/services/autographauthentication.

Spence, III, J., "Derek Jeter," JSA blog, Jan. 25, 2019, 5 pgs. https://www.spenceloa.com/blog/8964ab2e-bd05-42a2-aad6-5cc66ad1b0c3.

Caligiuri et al., "Kinematics of Signature Writing in Healthy Aging-*," NIH Public Access Author Manuscript, Jul. 2015, pp. 1-11, https://www.ncbi.nlm.nih.gov/pmc/articles/PMC4077921/.

Naylor, B., "Voter Recount Slowed Because of Signature Verification Process," npr, Nov. 16, 2018, 9 pgs. https://www.npr.org/2018/11/16/668508556/voter-recount-slowed-because-of-signature-verification-process.

Galbally et al., "Aging in Biometrics: An Experimental Analysis on On-Line Signature," PLoS ONE, Jul. 2013, vol. 8, Issue 7, Article e69897, pp. 1-17, https://journals.plos.org/plosone/article?id=10.1371/journal.pone.0069897.

Sawant et al., "Age invariant face recognition: a survey on facial aging databases, techniques and effect of aging," Artificial Intelligence Review, Aug. 2019, vol. 52, Issue 2, pp. 981-1008, Abstract Only. https://link.springer.com/article/10.1007/s10462-018-9661-z.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

MULTIFACTOR HANDWRITTEN SIGNATURE VERIFICATION

BACKGROUND

The present disclosure relates to signature verification and, more specifically, to handwritten signature verification based on a predictive model.

Handwritten signatures are used for authentication in various applications, such as on documents related to purchases, agreements, and authorizations. In some instances, signatures are accompanied by additional forms of identification, such as face and/or voice recognition. A signature can be compared to an earlier example of an individual's signature in order to determine whether the signature is authentic. The comparison can be carried out automatically (e.g., via image recognition and similarity algorithms) or by human handwriting experts.

SUMMARY

Various embodiments are directed to a system that includes at least one processing component, at least one memory component, and a reference storage comprising a set of reference signatures. The system also includes a model generator configured to generate a signature model based on the set of reference signatures. Further, the system includes a verification component configured to receive a signature, and determine whether the signature is valid. The verification component can determine that the signature is valid. The model generator can also update the signature model if it is determined that the signature is valid. The model generator can also reject the signature, and optionally update the signature model with the rejected signature, if the signature is determined not to be valid. The model generator can also generate a secondary model based on a set of reference secondary identifying information. The verification component can generate a signature progression score for the signature, and a secondary progression score for secondary identifying information. The verification component can then determine that the signature progression score and secondary progression score are consistent. Additionally, the verification component can determine that the signature progression score and secondary progression score are not consistent, reject the signature, and optionally update the set of reference signatures to include the rejected signature. In some embodiments, the signature model is a progression model.

Further embodiments are directed to a method that includes generating a signature model based on a set of reference signatures, receiving a signature, and determining whether the signature is valid. The method can also include determining that the signature is valid, and updating the signature model in response. The method can also include generating a secondary model based on a set of reference secondary identifying information, generating a signature progression score for the signature, and generating a secondary progression score for secondary identifying information. The method can also include determining that the signature progression score and secondary progression score are consistent. It can also be determined that the signature progression score and secondary progression score are inconsistent, the signature can be rejected, and the set of reference signatures can be updated to include the rejected signature. The signature model can be a progression model.

Additional embodiments are directed to a computer program product that includes a computer readable storage medium having program instructions that are executable by a processor to cause a device to perform a method that includes generating a signature model based on a set of reference signatures, receiving a signature, and determining whether the signature is valid. The method can also include determining that the signature is valid, and generating a secondary model based on a set of reference secondary identifying information, generating a signature progression score for the signature, and generating a secondary progression score for secondary identifying information. The method can also include determining that the signature progression score and secondary progression score are consistent. It can also be determined that the signature progression score and secondary progression score are inconsistent, and the signature can be rejected.

DETAILED DESCRIPTION

Handwritten signatures are used in a variety of contexts. For example, documents related to purchases, agreements, and authorizations; ballots; identification (ID) and/or credit cards; cheques; artwork; etc. are frequently hand-signed. Because these signatures are hand-signed, there can be variations between different copies of a signature written by the same person. However, it can be necessary to compare copies of the signature (e.g., automatically via image recognition and similarity measuring algorithms) in order to determine the veracity of a particular copy (e.g., to identify a forged signature). When current signature verification techniques are used for these comparisons, the signatures can be incorrectly identified due to variations caused by aging and/or health conditions that can affect a signing individual's movements and, thereby, handwriting. Thus, genuine signatures can be falsely identified as forgeries when they are compared to a static model based on an earlier version of an individual's signature. Similarly, forgeries can be falsely identified as genuine signatures despite mimicking only earlier versions of an individual's signature.

Disclosed herein are techniques for analyzing signatures while taking into account variations in individuals' handwriting over time. Timestamped reference signatures for a signing individual are gathered, and used to generate a model. This model can determine how a signature changes over time relative to the reference signatures. In some embodiments, the model simulates future versions of the signature. When the individual provides a signature, the signature is compared to the signature model to calculate a likelihood of the signature being authentic.

Models can also be generated based on other reference identifying information that is age-dependent, such as facial appearance, voice, etc. These models can be used to validate the signature model and/or confirm the identity of the signing individual. It should be noted that, while the techniques disclosed herein are discussed in the context of signature verification, the techniques can have various applications. For example, progressive models can be generated for handwriting samples other than signatures, hand-drawn images, etc.

Figure 1:
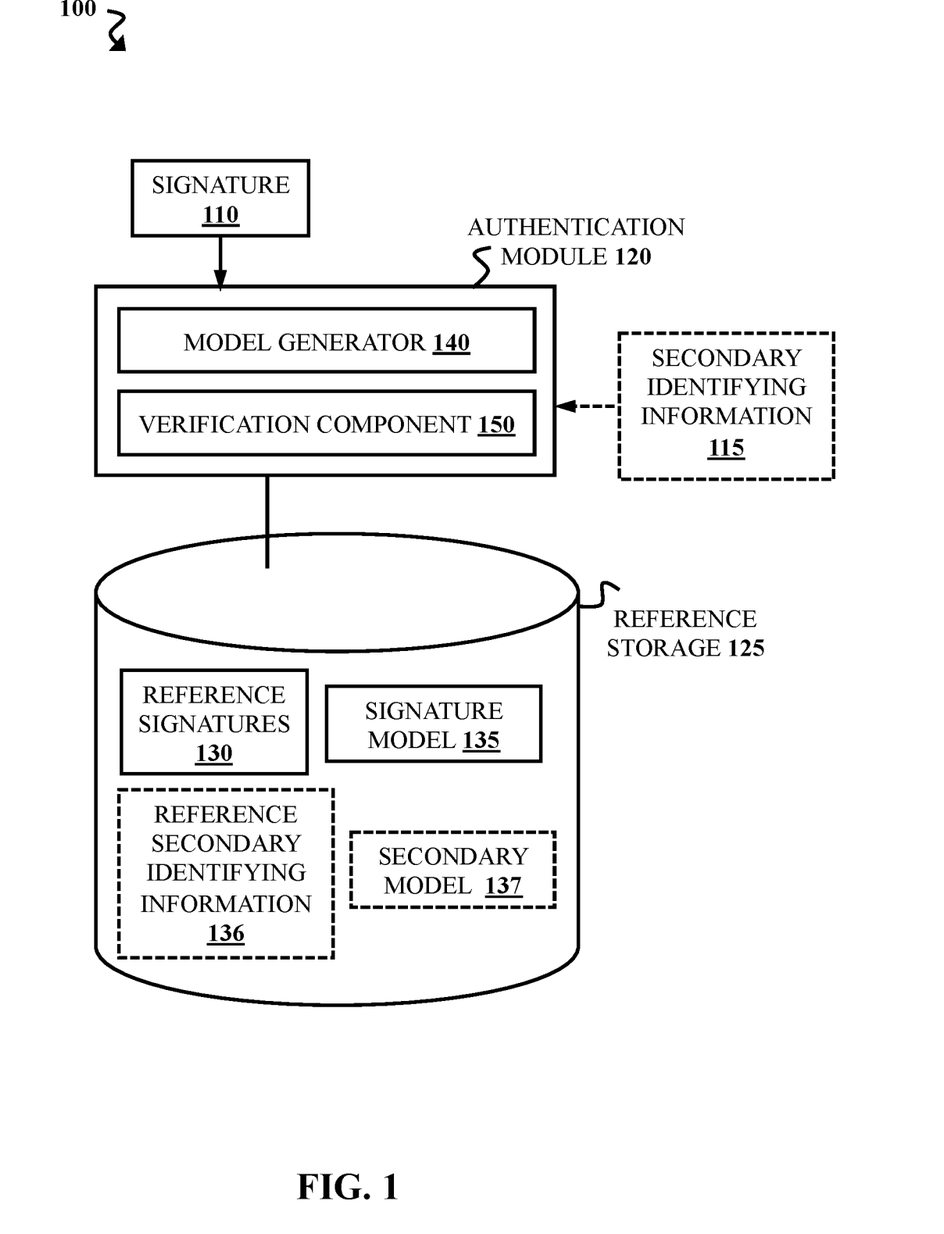
FIG. 1 is a block diagram illustrating a signature verification environment, according to some embodiments of the present disclosure.

FIG. 1 is a block diagram illustrating a signature verification environment 100, according to some embodiments of the present disclosure. The signature verification environment 100 includes a signature 110 and, optionally, secondary identifying information 115 provided by a signing individual, an authentication module 120, and a reference storage 125. The reference storage 125 contains a set of timestamped reference signatures 130 written by the signing individual and a signature model 135 for comparison to the signature 110. The reference storage 125 can also include a set of reference secondary identifying information 136 and a secondary model 137.

The signature model 135 is generated by a model generator 140 in the authentication module 120, and is based on the reference signatures 130. The authentication module 120 also includes a verification component 150 for verifying the signature 110 based on the signature model 135. In some embodiments, the signature model 135 is a progression model. However, the signature 135 can also be a generative model. Types of signature models 135 are discussed in greater detail below. The model generator 140 can also generate the secondary model 137 based on the reference secondary identifying information 137. In embodiments, the model generator 140 and the verification component 150 can be processor executable instructions that can be executed by a dedicated or shared processor using received inputs.

The signature 110 and reference signatures 130 are provided in a computer-readable format (e.g., as a digital photographic image). For example, a signed document can be photographed or scanned to produce a JPEG file, PDF file, etc. A user can optionally select the signature 110 in the document image using cursor movements in a user interface. In some embodiments, the signature 110 is automatically extracted from an image of a signed document using image recognition techniques known to persons of ordinary skill in the art. The signature can also be automatically located based on the document field it is in, such as a field located in a particular position on the document (e.g., the bottom right corner) and/or labeled "signature". In other embodiments, the signature 110 can be entered directly via a user interface. For example, an individual can sign on a touchscreen using a finger or stylus. Additional direct signing techniques can include cursor movements, hand gestures (e.g., in an augmented reality user interface), etc. The techniques used to obtain the signature 110 can also be used to obtain the reference signatures 130. The images of the signature 110 and each reference signature 130 can be processed using techniques such as gray conversion, noise reduction, edge enhancement, binarization, etc. These techniques are used to extract features such as width, height, aspect ratio, etc. from the signatures 110 and 130.

The reference storage 125 can be in the memory of a computing device such as a personal computer or a server (see, e.g., FIG. 3) and/or a blockchain configuration. For example, reference data such as the reference signatures 130 and associated extracted features can be stored in the blockchain as a record for the signing individual, along with logs of ongoing verification steps. The time, date, and context of each reference signature can be documented in the reference storage 125 as well. In some embodiments, a snapshot of selected reference data can be stored in the blockchain, based on risk analysis, to create the record. The reference signatures 130 can be updated when a current signature 110 is analyzed and added to the reference storage 125. This is discussed in greater detail with respect to FIG. 2.

The reference signatures 130 can be input by the signing individual (e.g., by signing at various intervals and/or providing previously signed documents) or another person who has access to documents signed by the signing individual. The reference signatures 130 can also be gathered automatically by the model generator 140. For example, reference signatures 130 can be obtained from a set of computer-readable images of signed documents (e.g., receipts) stored in a database.

In addition to reference signatures 130, the reference storage 125 can include reference secondary identifying information 136 such as sets of facial images (e.g., timestamped graphical images of the signing individual's face), voice recordings (e.g., timestamped audio recordings of the signing individual's voice), context information regarding the signing individual (e.g., name, age, health and/or demographic information, etc.), etc. The reference storage 125 can also include a secondary model 137 associated with each type of secondary identifying 115 information. Secondary model 137 examples are discussed in greater detail below. Further, the reference storage 125 can include verified modality of signature templates, such as associated workflows for a signature template (e.g., for creating, storing, or changing signatures).

Additional identifying information stored in the reference storage 125 can include biometric data (e.g., fingerprints and/or iris scans), copies of identifying documents (e.g., a birth certificate, passport, government ID, etc.) and/or associated information (e.g., name, date of birth, government ID number, etc.), records of the amount of time taken to write a signature, etc. Context information for signed documents associated with the reference signatures 130 can be stored as well. This information can include sensitivity scores (e.g., measures of document importance) and/or document categories (e.g., government documents, payment agreements, employment contracts, ballots, etc.).

The model generator 140 generates a signature model 135 based on the reference signatures 130. This model 135 is based on observed variations in the timestamped reference signatures 130, and predicts how features of the signing individual's handwritten signature will change over time. The model's 135 prediction can also take into account other factors that may affect how the signature 110 will appear at a given time based on, for example, health conditions that can affect mobility and handwriting (e.g., Parkinson's disease, Alzheimer's disease, etc.). In some embodiments, the signature model 135 is a progression model. For example, the signature model 135 can be generated with a recurrent neural network (RNN) such as a long short-term memory (LSTM). However, any appropriate modeling techniques can be used. For example, the signature model 135 can be a generative model generated using, e.g., Hidden Markov Models or Naïve Bayes models.

Using techniques such as those used to generate the signature model 135, the model generator 140 can generate at least one secondary model 137 based on the reference secondary identifying information 136. For example, a secondary model 137 can be based on variations in timestamped facial images. In some embodiments, the secondary model 137 incorporates factors such as health conditions, demographic information, and/or environmental factors that can affect the progression of secondary identifying information 115. For example, a secondary model 137 based on facial images can take into account predicted sun exposure based on the geographical location of the signing individual's residence.

The verification component 150 compares the signature 110 to the signature model 135, and determines whether the signature 110 is valid. When the signature model 135 is a generative model, the verification component 150 determines that the signature 110 is valid if the signature 110 has a similarity to a signature generated by the model 135 that is greater than a similarity threshold (e.g., 80%, 90%, 95%, etc.). When the signature model 135 is a progression model, the verification component 150 determines whether the signature 110 is a valid signature in the sequence of reference signatures 130 consisting with aging.

Further, when the signature 110 has been validated, a signature progression score based on the degree of change in the signature 110 relative to the reference signatures 130 can also be generated. For example, a signature progression score can be a number of years (e.g., five years, fifteen years, thirty years, etc.) assumed to have elapsed based on a degree of change in current signature 110 relative to the reference signatures 130. A secondary progression score can also be generated based on a comparison between the current secondary identifying information 115 and the secondary model 137. For example, the secondary progression score can be a number of years assumed to have elapsed based on a degree of change in the current secondary identifying information 115 relative to the reference secondary identifying information 136. For example, a secondary progression score can be based on a comparison of a current facial image to a secondary model 137 based on reference facial images.

The verification component 150 can determine the probability of a progression score being correct based on the confidence of the associated progression model 135 or 137. For example, if the signature model 135 generates a progression score of five years with a confidence value of 0.8, the verification component 150 can determine that there is an 80% probability of the score being accurate. The progression score and probability can then be used to further verify the signature 110 based on the consistency between the signature progression score and a secondary progression score, weighted by their respective probabilities.

For example, the signature progression score can be five years with a probability of 80%, and the secondary progression score can be thirty years with a probability of 30%. Five years can then be selected as the progression score because of its higher probability. For example, five years can have a probability (80%) greater than a probability threshold (e.g., 75%), while thirty years can have a probability (30%) lower than the probability threshold. The authenticity of the validated signature 110 can then be confirmed because the secondary identifying information 115 does not produce a conflicting score having a high enough confidence value to be inconsistent. In another example, the signature progression score (five years) and secondary progression score (thirty years) can each have probabilities of 90%. Therefore, the signature progression score would not be consistent with the secondary progression score, resulting in rejection of the signature 110.

In another example, the signature 110 can be accompanied by signatures of witnesses. The verification component 150 can verify the witness signatures using signature models and/or secondary models for the witnesses, if available. The signature 110 may be accepted as authentic only if the witness signatures are also accepted. Whether or not the signature 110 is accepted can also be based on a document sensitivity score. The sensitivity score can be automatically set or selected by a user (e.g., the originator or signer of the document) based on factors such as the category and/or importance of the document. For example, a government document can have a higher sensitivity score than a receipt for a retail purchase. There can be a sensitivity score threshold associated with a document. If the sensitivity score for the signed document is above a threshold sensitivity score, the verification component 150 can automatically raise the similarity threshold and/or the probability threshold for the signature 110 and, optionally, secondary identifying information 115.

The verification component 150 can add the signature 110 and any received secondary identifying information 115 (e.g., voice recordings, facial images, etc.) to the reference signatures 130 and reference secondary identifying information 136, respectively. The updated reference information 130 and/or 136 can then be used to retrain the signature model 135 and/or the secondary model 137. In some embodiments, the signature 110 is added to the reference signatures 130 only when it has been accepted as authentic. However, rejected signatures can be stored as well (e.g., as negative examples) in other embodiments. Additional information that can be stored can include confidence values for progression scores, probability threshold values, sensitivity threshold values, etc. Model updates can also be made based on non-signature information such as location, time, demographic information, etc. periodically added to the reference storage 125.

Figure 2:
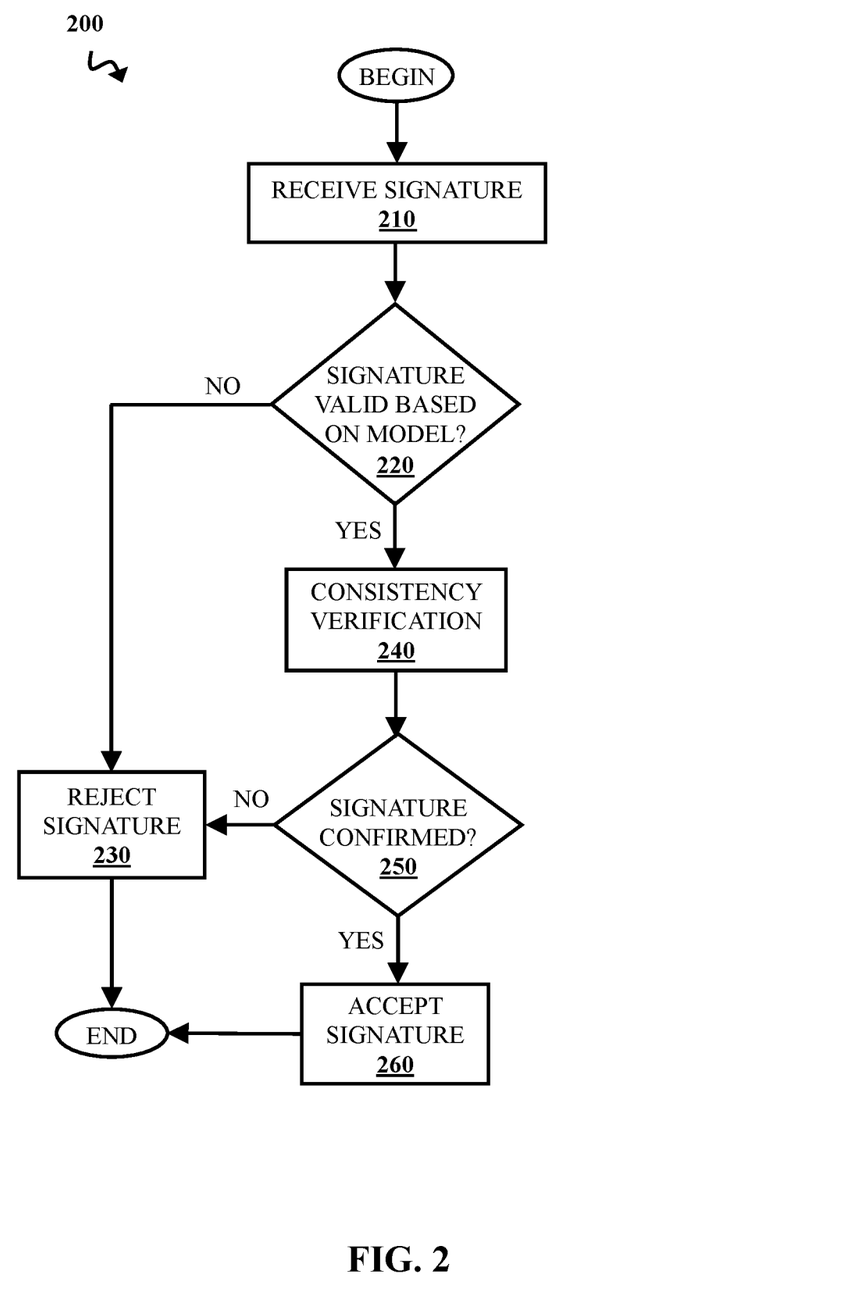
FIG. 2 is a flow diagram illustrating a process of verifying a signature, according to some embodiments of the present disclosure.

FIG. 2 is a flow diagram illustrating a process 200 of verifying a signature, according to some embodiments of the present disclosure. To illustrate process 200, but not to limit embodiments, FIG. 2 is described within the context of the signature verification environment 100 of FIG. 1. Where elements shown in FIG. 2 are identical to elements shown in FIG. 1, the same reference numbers are used in both Figures.

A signature 110 is received by the authentication module 120. This is illustrated at step 210. The signature 110 can be a handwritten signature from a document in a computer-readable format (e.g., extracted from a graphical image of the document). The signature 110 can also be entered directly into a user interface by the signing individual (e.g., via a touchscreen) in some embodiments. The signature 110 is processed in order to extract its features. This is discussed in greater detail with respect to FIG. 1. In some embodiments, other identifying information from the signing individual is received at step 210 as well. For example, the authentication module 120 can receive a voice recording, facial image, fingerprint, government-issued ID, iris scan, etc. from the signing individual.

It is then determined whether the signature 110 is valid based on a signature model 135. This is illustrated at step 220. The signature model 135 is generated by the model generator 140 (e.g., using deep learning techniques) based on a series of reference signatures 130 stored in the reference storage 125 (e.g., in a blockchain database). In some embodiments, the verification component 150 determines whether the signature 110 is authentic using a signature model 135 based on a sequence neural network (e.g., LSTM) that has learned the progression of how the signature evolves over time based on timestamped signature training data (e.g., the reference signatures 130). The signature model 135 takes as input the sequence of reference signatures 130 and the entered signature 110, and determines whether the signature 110 is a valid progression of the reference signature 130 sequence. If the signature model 135 indicates that the signature 110 is a valid progression, the signature 110 is determined to be valid. In other embodiments, the signature model 135 can be a generative model, and the signature 110 can be identified as valid if the signature 110 and a signature generated by the model have a similarity greater than a threshold similarity. The threshold similarity can be raised if the signed document has a sensitivity score that is above a sensitivity score threshold.

If the signature 110 is determined not to be valid based on the signature model 135, the signature 110 is rejected. This is illustrated at step 230. When the verification component 150 rejects the signature 110, the signature 110 and/or signed document can be tagged as possible forgeries. A notification can also be generated to indicate that a potential forgery has been detected. The notification can optionally be sent to a user (e.g., via email or a generated report). In some embodiments, the notification can prompt the user to enter a second signature, or to obtain a different type of validation. For example, a person can check a photo ID belonging to the signing individual. When the signature 110 has been rejected, process 200 can end. However, in some embodiments, process 200 can instead proceed to step 260 (see below), whereupon the rejected signature 110 is added to the reference signatures 130, and used as a negative example when the signature model 135 is retrained.

However, if the signature 110 is determined to be valid based on the signature model 135, an additional consistency verification is carried out to confirm the authenticity the signature 110. This is illustrated at step 240. The verification component 150 produces a progression score and probability for the signature 110. The verification component 150 also produces a progression score and probability for provided secondary identifying information 115 (e.g., voice samples, facial images, etc.). This information 115 can be provided by the signing individual at step 210 or step 240. The progression scores are degrees of change observed in the current signature 110 and secondary identifying information 115 relative to the reference signatures 130 and reference secondary identifying information 136, respectively. The probabilities for each progression score are based on the confidence of the respective models 135 and 137. For example, the signature progression score can be one year with a probability of 75%, and the secondary progression score can be ten years with a probability of 10%.

It is then determined whether the signature progression score is consistent with the secondary progression score. This is illustrated at step 250. The progression scores are weighted based on their probabilities, and the consistency between the weighted progression scores is determined. This is discussed in greater detail with respect to FIG. 1. If the progression scores are determined to be inconsistent, process 200 proceeds to step 230, whereupon the signature 110 is rejected.

However, if the progression scores are determined to be consistent, the signature 110 is accepted, and the signature model 135 is updated. This is illustrated at step 260. The verification component 150 adds the accepted signature 110 and associated timestamp to the set of reference signatures 130 in the reference storage 125. In some embodiments, a notification or label is generated to indicate that the signature 110 is accepted. In other embodiments, no notification is generated, but the signature 110 and/or signed document can be tagged as authentic. The verification component 150 can also add the secondary identifying information 115 to the reference secondary identifying information 136, and the associated secondary model 137 can be updated.

The model generator 140 retrains the signature model 135 based on the updated reference signatures 130. The model generator 140 can also retrain the secondary model 137 based on the updated reference secondary identifying information 136. Techniques for retraining the models 135 and 137 can include principal component analysis, singular value decomposition, deep learning, LSTM-based sequence learning, etc. In some embodiments, the retraining occurs only when the signature 110 has been validated and/or confirmed. For example, validation of the signature 110 can trigger access to and analysis of the reference signatures 130, reference secondary identifying information 136, and any other information in a blockchain reference storage 125.

When the signature 110 is accepted at step 260 and the signature model 135 and, optionally, the secondary model 137 have been updated, process 200 ends. It should be noted that, in some embodiments, step 250 can be omitted from process 200. In these instances, the signature 110 can be accepted when it is determined at step 220 that the signature 110 is valid.

Figure 3:
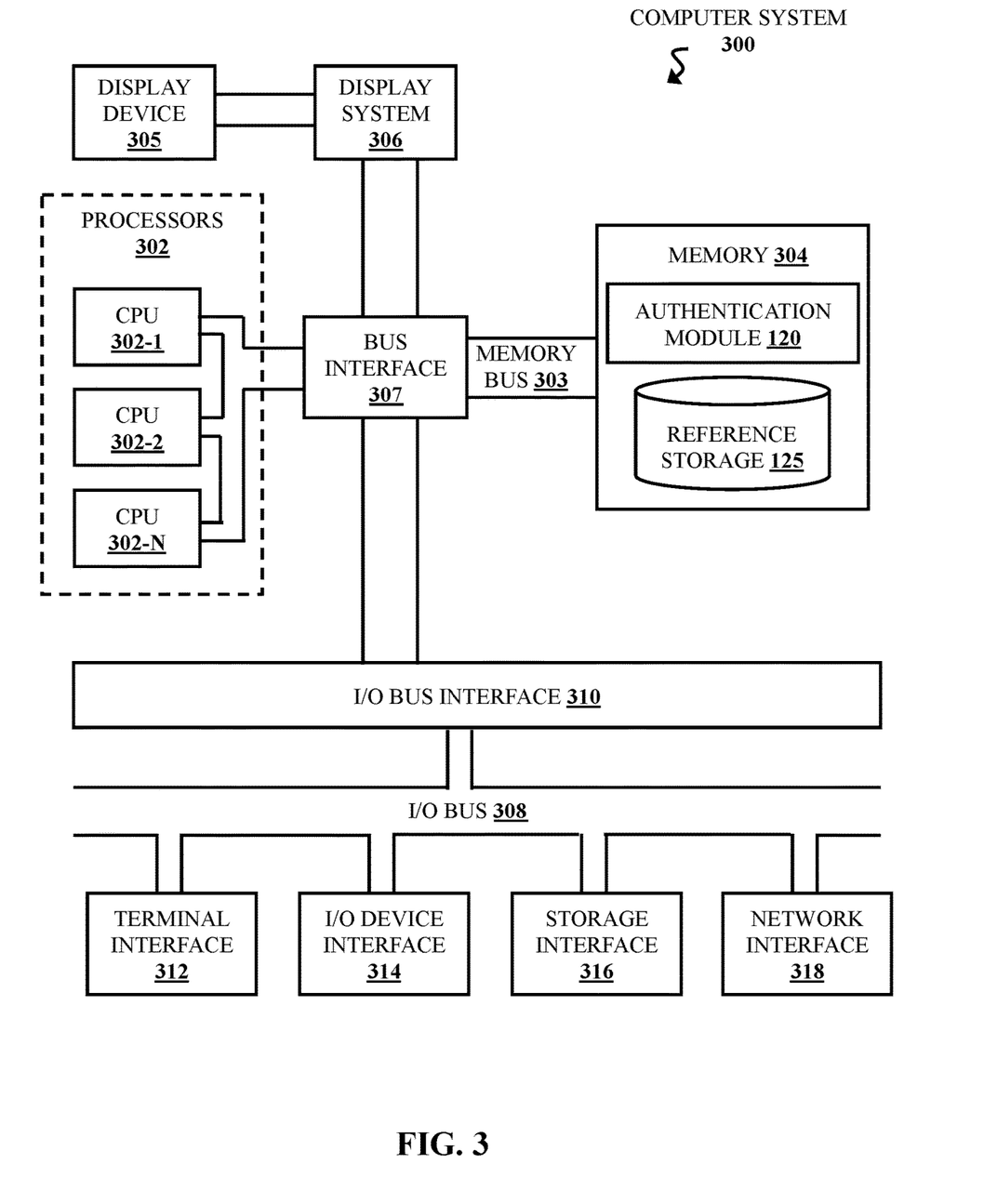
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 304 also contains an authentication module 120 and a reference storage 125 (illustrated in FIG. 1).

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the authentication module 120 and the reference storage 125 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the authentication module 120 and reference storage 125 include instructions that execute on the processor 302 or instructions that are interpreted by instructions that execute on the processor 302 to carry out the functions as further described in this disclosure. In another embodiment, the authentication module 120 and reference storage 125 are implemented in hardware via semiconductor devices, chips, logical gates, circuits, circuit cards, and/or other physical hardware devices in lieu of, or in addition to, a processor-based system. In another embodiment, the authentication module 120 and reference storage 125 include data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
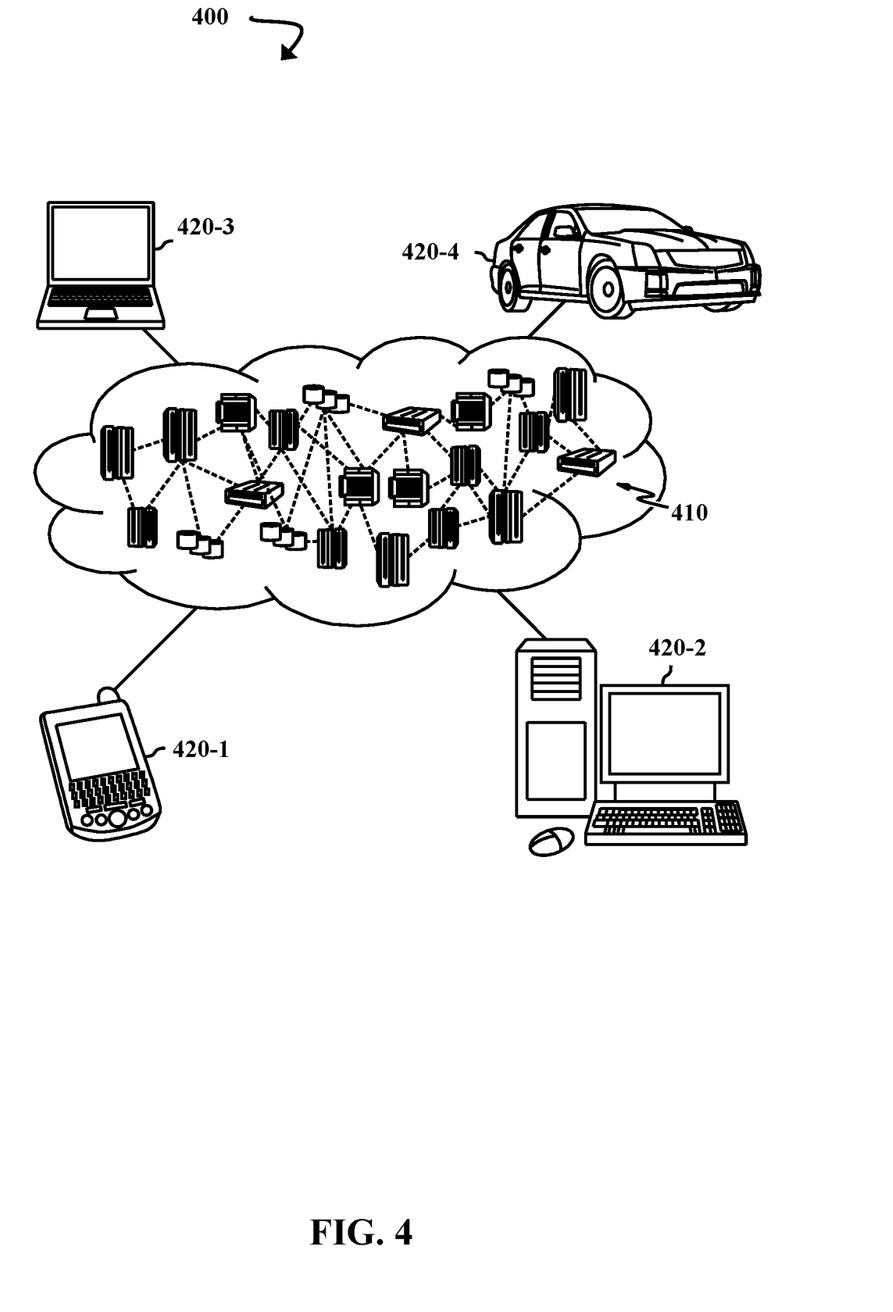
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
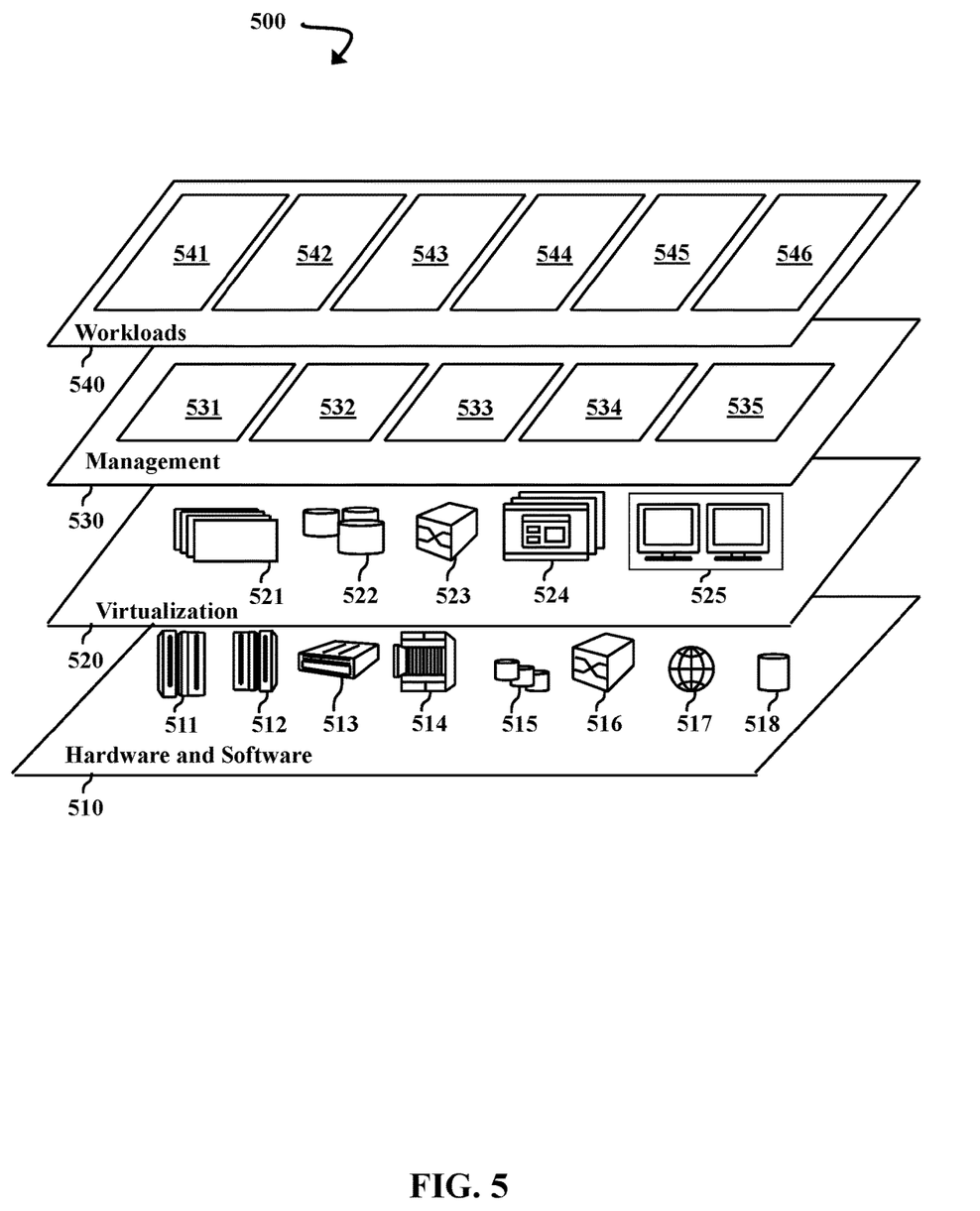
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include mapping and navigation 541; software development and lifecycle management 542; virtual classroom education delivery 543; data analytics processing 544; transaction processing 545; and signature verification 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory; and
   a processor communicatively coupled to the memory, wherein the processor is configured to:
   generate a signature model based on a set of time-stamped reference signatures associated with a user;
   receive a signature;
   determine, based on the signature model and a timestamp of the signature, that the signature is valid; and
   in response to the determining that the signature is valid, authenticate the signature, wherein the authenticating comprises:
   generating a signature progression score indicating degrees of change in the signature relative to the set of reference signatures;
   generating a secondary progression score indicating degrees of change in current secondary identifying information relative to a set of reference secondary identifying information; and
   determining whether the signature progression score is consistent with the secondary progression score.

2. The system of claim 1, wherein the processor is further configured to update the signature model to include the signature, the timestamp, and results of the determining that the signature is valid.

3. The system of claim 1, wherein the signature model is a progression model.

4. A method, comprising:
   generating a signature model based on a set of time-stamped reference signatures associated with a user;
   receiving a signature;
   determining, based on the signature model and a timestamp of the signature, that the signature is valid; and
   in response to the determining that the signature is valid, authenticating the signature, wherein the authenticating comprises:
   generating a signature progression score indicating degrees of change in the signature relative to the set of reference signatures;
   generating a secondary progression score indicating degrees of change in current secondary identifying information relative to a set of reference secondary identifying information; and
   determining whether the signature progression score is consistent with the secondary progression score.

5. The method of claim 4, further comprising updating the signature model to include the signature, the timestamp, and results of the determining that the signature is valid.

6. The method of claim 4, wherein the signature model is a progression model.

7. The method of claim 6, wherein the signature is determined to be valid when the signature is consistent with a sequence of the reference signatures over time.

8. The method of claim 4, wherein the signature model is a generative model.

9. The method of claim 8, wherein the signature is determined to be valid if the signature matches a predicted signature generated by the signature model for the timestamp.

10. The method of claim 4, wherein the reference secondary identifying information comprises timestamped biometric data.

11. The method of claim 4, wherein the signature model is based on variation over time in handwriting of the user.

12. The method of claim 4, wherein the reference secondary identifying information is related to factors affecting handwriting of the user.

13. The method of claim 12, wherein the factors comprise age and health of the user.

14. The method of claim 4, wherein the signature progression score predicts an amount of time elapsed between the signature and the reference signatures.

15. The method of claim 14, wherein the signature progression score is weighted based on a confidence value for the predicted amount of time.

16. The method of claim 4, wherein the signature progression score predicts an amount of time elapsed between the signature and the reference signatures, and wherein the signature progression score is weighted based on a confidence value for the predicted amount of time elapsed between the signature and the reference signatures.

17. The method of claim 16, wherein the secondary progression score predicts an amount of time elapsed between the current secondary identifying information and the reference secondary identifying information, and wherein the secondary progression score is weighted based on a confidence value for the predicted amount of time elapsed between the current secondary identifying information and the reference secondary identifying information.

18. The method of claim 17, wherein the determining whether the signature progression score is consistent with the secondary progression score comprises comparing the weighted secondary progression score with the weighted signature progression score.

19. The method of claim 4, wherein access to a reference storage containing the reference signatures and the reference secondary information is provided in response to the determining that the signature is valid.

20. The method of claim 19, wherein the reference storage is a blockchain database.

21. A computer program product, comprising a computer readable storage medium having program instructions embodied therewith, the program instructions executable by a processor to cause a device to perform a method, the method comprising:
   generating a signature model based on a set of time-stamped reference signatures associated with a user;
   receiving a signature;
   determining, based on the signature model and a timestamp of the signature, that the signature is valid; and
   in response to the determining that the signature is valid, authenticating the signature, wherein the authenticating comprises:
   generating a signature progression score indicating degrees of change in the signature relative to the set of reference signatures;
   generating a secondary progression score indicating degrees of change in current secondary identifying information relative to a set of reference secondary identifying information; and determining whether the signature progression score is consistent with the secondary progression score.

* * * * *